April 10, 1934.  E. MOEHRLE  1,954,573
PROCESS FOR THE TREATMENT OF HEAVY HYDROCARBONS
Filed April 3, 1931
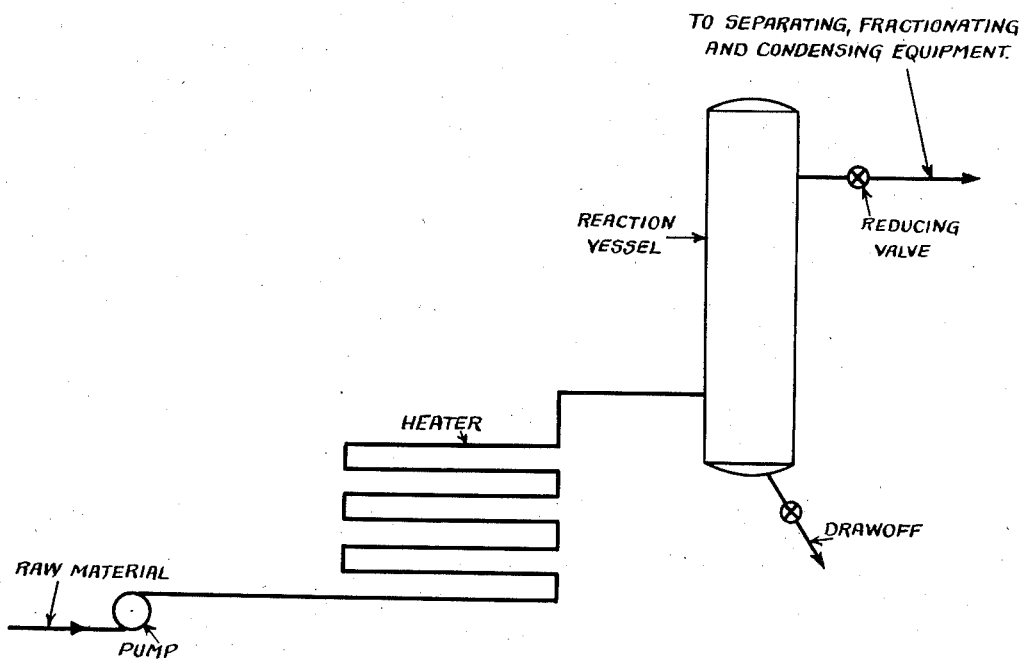
Inventor:
Eduard Moehrle,
By ........ Attys.

Patented Apr. 10, 1934

1,954,573

UNITED STATES PATENT OFFICE 1,954,573

PROCESS FOR THE TREATMENT OF HEAVY HYDROCARBONS

Eduard Moehrle, Duisburg-Meiderich, Germany

Application April 3, 1931, Serial No. 527,613
In Germany June 7, 1930

5 Claims. (Cl. 196—52)

This invention relates to a new and improved process for the obtaining of valuable products from high-boiling hydrocarbons and more particularly to a process for the treatment of heavy hydrocarbons to produce lighter hydrocarbons.

In the cracking of high-boiling hydrocarbons by usual cracking methods, the resultant products include large amounts of olefines which decrease the value of the benzine or gasoline produced because of the high loss of material in the necessary acid treatment. In the cracking processes large amounts of gas result, this gas contains olefines and paraffins and also a large amount of hydrogen which is split off during cracking.

It is an object of the present invention to provide a method for the treatment of high-boiling hydrocarbons in which the hydrogen liberated during cracking may be brought into contact with the hydrocarbon in the presence of other materials which serve to promote reaction between the hydrogen and hydrocarbons.

It is a further object to provide a method whereby halogen or compounds which liberate halogen under the reaction conditions may be used in the treatment of the hydrocarbons.

It is also an object to provide a method whereby the halogen and hydrogen are brought into contact with the larger particles resulting from the cracking operation at the moment of the production of the hydrogen.

It is an additional object to provide a method which improves the quality of benzine or gasoline, decreases the gas loss and changes the higher boiling polymerization products formed by the reaction into lubricating oil of very good viscosity and color.

Other and further objects will appear as the description proceeds.

I have shown somewhat diagrammatically in the single figure of the accompanying drawing, a layout of apparatus suitable for carrying out my improved process. The drawing will be readily understood from the legends thereon.

The raw material is passed through the pump and then through the heater and introduced at an intermediate point in the reaction vessel. The lighter products of the process are drawn off through the reducing valve and carried to separating, fractionating and condensing equipment, which has not been shown. The heavier products may be taken from the reaction vessel through the draw-off located at the lower end thereof.

In one specific example of a method of carrying out the invention, 500 kilograms of gas oil was heated in a pressure vessel for an hour, one-half kilogram of iodine being placed in the vessel with the oil and the whole being stirred during the process. The material was heated to a temperature of 460° C. and during the process the pressure in the vessel increased to about eighty atmospheres. After cooling, the material was withdrawn from the vessel and found to consist then of 380 kilograms of liquid and 120 kilograms of valuable gas. On distillation of the liquid reaction products, 40% by weight was found to be benzine of a saturated character, while about 20% was recovered as unchanged gas oil. The high-boiling reaction products which are distilled in a good vacuum have the properties of very satisfactory lubricating oils.

The pressure vessel used was made of chromium nickel alloy steel especially designed to withstand the high pressures and temperatures used in the process. The conditions under which the reaction takes place determine the type of material out of which the vessel is to be constructed rather than any catalytic activity which might be expected from the metal surface. The vessel itself is not intended to have any catalytic activity and it is not believed that it had such activity in the example above stated.

In general the process may be said to include the treatment of high-boiling hydrocarbons with the addition of halogen or compounds giving off halogen under the reaction conditions, under pressures over fifty atmospheres and at temperatures of from 350° C. to 550° C. Iodine or iodine compounds which give off iodine under the reaction conditions or otherwise indirectly produce iodine, are suitable for use as catalysts in the reaction. The halogen used is in such a low concentration, less than one percent, that in the experiments which have been performed no extensive corrosion has been observed. The iodine is used in concentrations of less than one percent and preferably in concentrations of a small fraction of one percent. The method is carried out in an atmosphere free of hydrogen except that which may be produced by cracking during the reaction.

While one specific example has been given, this is to be understood as illustrative only, as the method may be used with hydrocarbons other than gas oil and at any temperatures and pressures coming within the spirit and scope of the appended claims. Halogens other than iodine may also be used.

I claim:

1. A process for the conversion of heavy hydrocarbons, which comprises treating the hydrocarbons with a small quantity of a halogen having the effect of elemental iodine under a pressure of over fifty atmospheres and at a temperature in excess of 350 degrees C., in an atmosphere substantially free of hydrogen except for hydrogen liberated from the heavy hydrocarbons or their derivatives being treated during the reaction.

2. A process for the conversion of heavy hydrocarbons, which comprises treating the hydrocarbons with a small quantity of a halogen having the effect of elemental iodine under a pressure of over fifty atmospheres and at a temperature in excess of 350 degrees C., in an atmosphere substantially free of hydrogen except for hydrogen liberated from the heavy hydrocarbons or their derivatives being treated during the reaction, and agitating the material during the treatment.

3. A process for the conversion of heavy hydrocarbons, which comprises treating the hydrocarbons with a small quantity of compounds giving off a halogen having the effect of elemental iodine under the conditions of the reaction and under a pressure of over fifty atmospheres and at a temperature in excess of 350 degrees C., in an atmosphere substantially free of hydrogen except for hydrogen liberated from the heavy hydrocarbons or their derivatives being treated during the reaction.

4. A process for the conversion of heavy hydrocarbons, which comprises treating the hydrocarbons with a small quantity of iodine under a pressure of over fifty atmospheres and at a temperature in excess of 350 degrees C. in an atmosphere substantially free of hydrogen, except for hydrogen liberated during the reaction by the heavy hydrocarbons or their derivatives.

5. A process for the treatment of heavy hydrocarbons, which comprises treating the hydrocarbons with less than one percent of compounds liberating elemental iodine under the reaction conditions under a pressure of over fifty atmospheres and at temperatures between 350 degrees C. and 550 degrees C., in an atmosphere substantially free of hydrogen except for hydrogen liberated during the reaction by the heavy hydrocarbons or their derivatives, whereby the material is cracked, the hydrogen and gases resulting from the cracking being brought into contact at the moment of their production with the larger particles resulting from the cracking in the presence of elemental iodine, to produce gas, benzine and higher boiling polymerization products suitable for use as lubricating oils.

EDUARD MOEHRLE.